United States Patent [19]

Weaver

[11] Patent Number: 4,625,134
[45] Date of Patent: Nov. 25, 1986

[54] MEANS FOR MOUNTING A GEAR TRAIN AND MOTOR

[75] Inventor: Robert F. Weaver, Brownsburg, Ind.

[73] Assignee: Emhart Industries, Inc., Indianapolis, Ind.

[21] Appl. No.: 715,976

[22] Filed: Mar. 25, 1985

[51] Int. Cl.⁴ ............................................. H02K 7/06
[52] U.S. Cl. ...................................... 310/83; 310/89; 310/91
[58] Field of Search ................... 310/49 R, 83, 66, 89, 310/91

[56] References Cited

U.S. PATENT DOCUMENTS

| | | |
|---|---|---|
| 2,465,042 | 3/1949 | Schlenker et al. ................ 310/83 X |
| 3,303,365 | 2/1967 | Hennessey ............................ 310/83 |
| 3,558,940 | 1/1971 | Chestnut et al. ................. 310/83 X |
| 3,575,621 | 4/1971 | Voland et al. .................... 310/83 X |
| 3,676,725 | 7/1972 | Wiser et al. ..................... 310/83 X |
| 4,086,753 | 5/1978 | Tsuchiya et al. ................. 310/83 X |
| 4,087,709 | 5/1978 | Haydon ................................ 310/83 |
| 4,088,910 | 5/1978 | Frey ................................. 310/83 X |

Primary Examiner—Mark O. Budd
Attorney, Agent, or Firm—Robert F. Meyer

[57] ABSTRACT

A motor is held to a gear train by a cradle which carries the motor and is connected to a housing for the gear train. The cradle includes a base and legs extending from the base with the distal ends of the legs engaging apertures in the housing. Each of the legs has tabs at their distal ends to lock the cradle in place.

1 Claim, 3 Drawing Figures

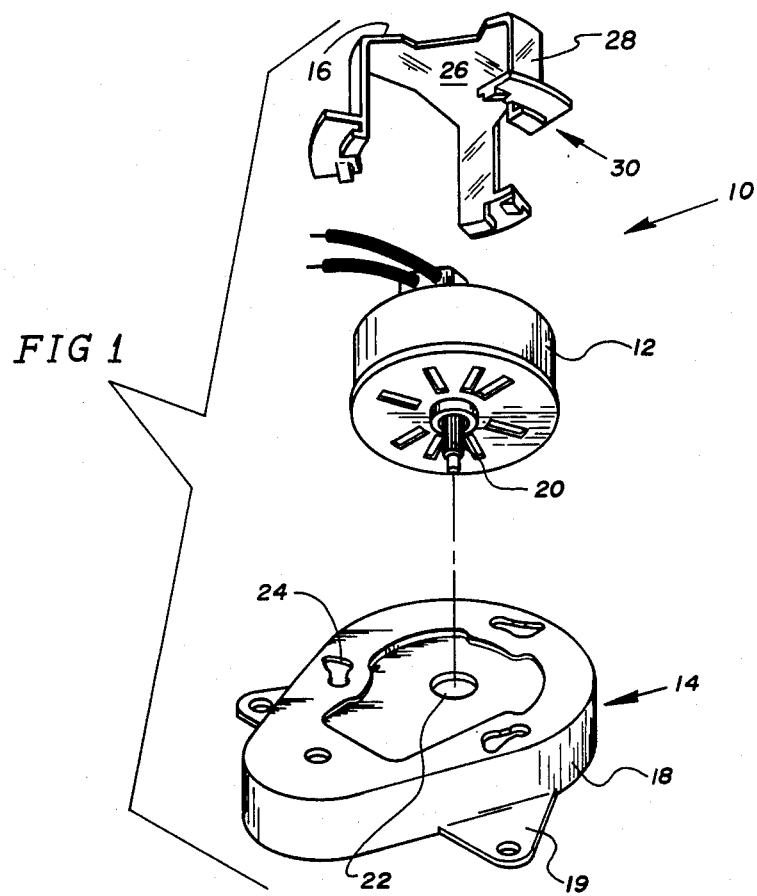
FIG 1
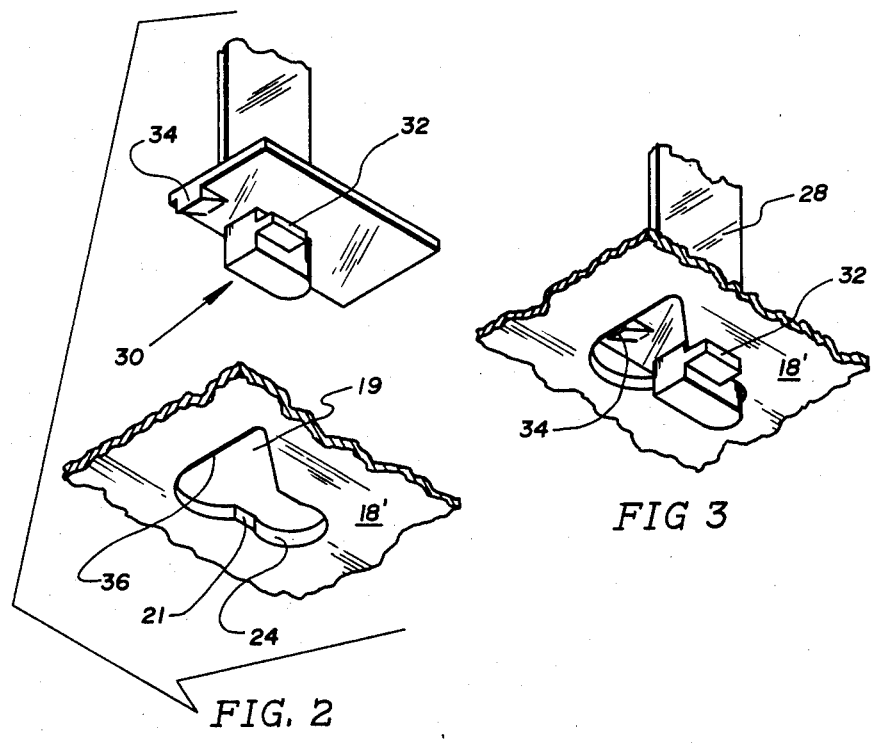
FIG 2
FIG 3

MEANS FOR MOUNTING A GEAR TRAIN AND MOTOR

BACKGROUND OF THE INVENTION

The present invention relates generally to syncnronous motors and the gear trains associated therewith; and more particularly, to a means and method of holding the two together.

A multitude of applications for synchronous motors of the type using a permanent magnet rotor are known. Such applications include, for example, a drive means for timing devices such as electric clocks and the like, and as a drive means for sequence timers, such as the type used with washing machines, dishwashers, dryers and the like.

The synchronous motor has a high R.P.M. output which must be reduced significantly if the motor is to be used with the sequence timer. The generally accepted practice is to reduce the output speed of the motor by interposing the gear reduction means between the output of the motor and the input of the sequence timer. In some type of constructions, the gear train cooperatively associated with the motor is incorporated within the housing retaining the motor. With this type of construction, it may be necessary to replace the entire motor assembly if any one of the gear teeth of the gear train becomes crowned or reaches the end of its useful life through some type of failure. In addition, if a different output speed is required, it would be entirely possible that the entire motor assembly would need to be replaced rather than merely replacing the inexpensive gear train.

To this end, the art has, in recent years, enclosed a synchronous motor and the gear train in separate housings. This type of construction leads to the problem of holding the two housings together such that the motor pinion is always in ecact alignment with the first gear or pinion of the gear train. Futhermore, a holding means should be of some a construction that the gear train is easily disconnected from the housing of the motor such that the output speed can be readily changed.

In U.S. Pat. No. 3,676,725 there is described and claimed a synchronous motor and gear train wherein the motor and gear train are carried in separate housings. The housings are held together through tabs extending from the motor housing and engaging apertures in the gear train housing. While this arrangement has been found to be quite satisfactory, it does have the disadvantage of being limited to the particular motor and gear train size; that is, various sizes of motors and gear trains are not readily interchangeable.

SUMMARY OF THE INVENTION

Accordingly, there is provided a motor and gear train assembly which in general comprises a gear train enclosed in a housing and apertures spaced around a periphery of the housing, a motor carried on the housing, and a cradle holding the motor on the housing, the cradle including locking means engaging the apertures to hold the cradle and the motor on the housing.

DESCRIPTION OF THE DRAWINGS

FIG. 1 is an exploded view of the motor and gear train assembly.

FIG. 2 is an exploded view of a portion of the cradle and the gear train housing.

FIG. 3 is a view showing a portion of the cradle assembled to the gear train housing.

DETAILED DESCRIPTION OF THE INVENTION

Referring now to the drawings, there is shown a motor and gear train assembly 10 which in general includes a motor 12, a gear train 14, and a cradle 16 which holds the motor onto the gear train. Motor 12 may be of the synchronous motor type such as described in the aforementioned U.S. Pat. No. 3,676,725. Likewise, the gear train that is carried in gear train housing 18 is of the type described in U.S. Pat. No. 3,676,725. Since the particular motor or gear train does not form part of the invention, they are not shown or described in detail. Suffice it to say that the motor is mechanically coupled to the gear train through a motor output pinion 20 which extends through aperture 22 to engage a gear of the gear train.

Gear train housing 18 includes keyhole shaped apertures 24 spaced about the periphery of the housing and which are adapted to receive cradle 16. The housing may be connected to a device to be driven, such as a timer, through ears 19. As shown, cradle 16 includes a base 26 and legs 28 extending from the base. Motor 12 fits within the confines of the legs against the base to hold the motor against housing 18. Cradle 16 also includes a locking means 30 which secures the cradle to housing 18 until such time as the motor needs to be removed.

Referring to FIGS. 2 and 3, locking means 30 includes tab 32 and spring tab 34 carried at the distal ends of legs 28. Tab 34 engages the underneath side 18' of housing 18 while spring tab 34 engages sides 36 of apertures 24. To assemble the motor to the gear train, the motor is first positioned within the cradle 16 and legs 28 inserted into keyhole apertures 24 such that tab 32 enters the larger portion 19 of the aperture. The cradle is then rotated counterclockwise so that tab 32 engages the underneath side 18' of the gear train housing at the neck portion 21 of the aperture. And as the cradle is rotated, spring tab 34 snaps into the aperture and butts against side 36 of the aperture.

What is claimed:

1. A motor and gear train assembly comprising
   (a) a gear train enclosed in a housing and keyhole shaped apertures spaced around the periphery of said housing,
   (b) a motor carried on said housing, and
   (c) a cradle holding said motor on said housing, said cradle including a base and legs extending therefrom,
   (d) each of said legs having locking means extending from distal ends of said legs to hold said cradle and said motor on said housing comprising a tab extending from said distal ends through said keyhole apertures and engaging an underside of said housing and a spring tab extending from said distal ends and engaging an edge of said housing formed by said keyhole apertures.

* * * * *